No. 893,357. PATENTED JULY 14, 1908.
F. E. NEUMANN.
SHAVING MIRROR.
APPLICATION FILED OCT. 22, 1907.
2 SHEETS—SHEET 1.
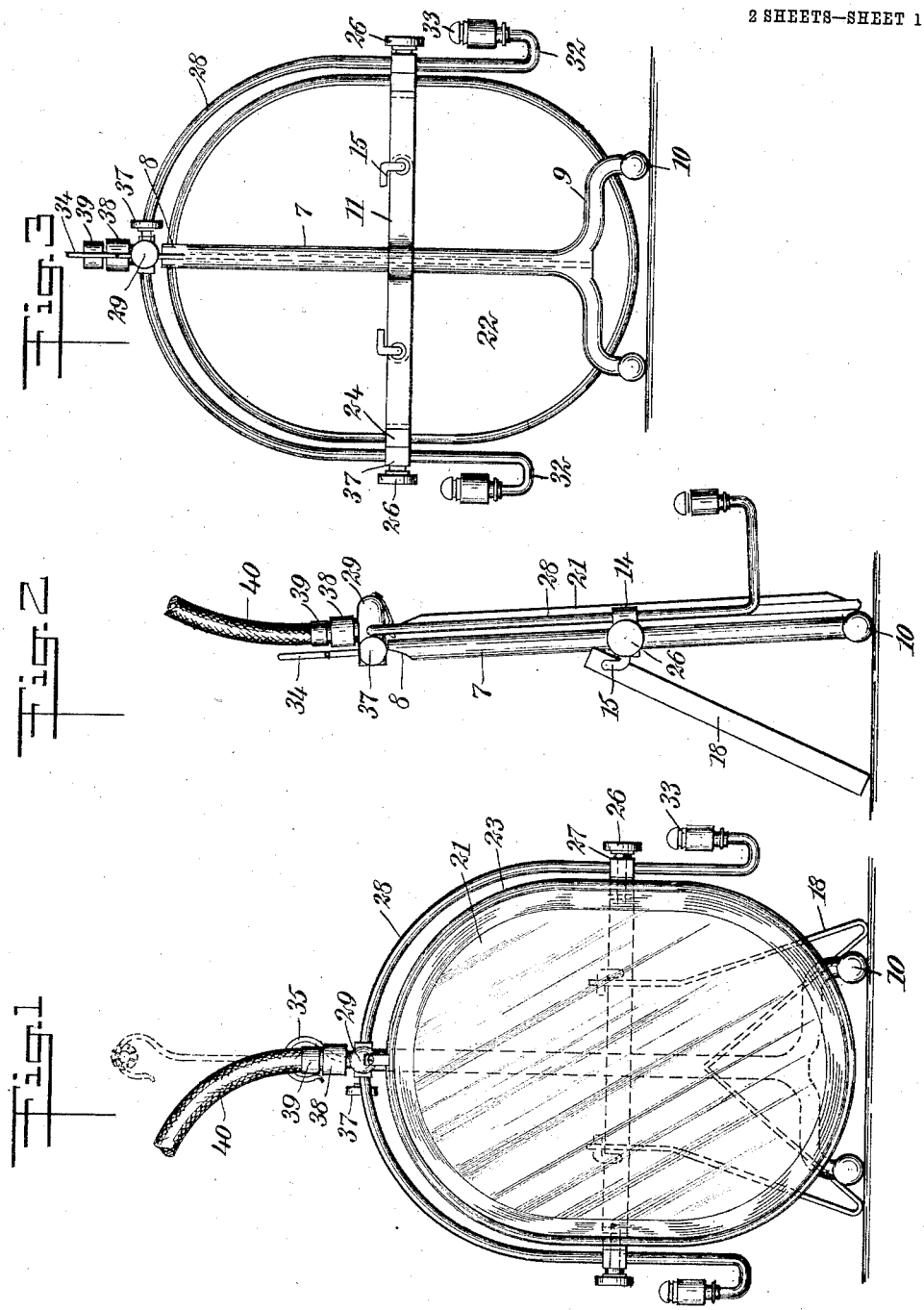
WITNESSES
INVENTOR
Friederich Eduard Neumann
BY
ATTORNEYS No. 893,357. PATENTED JULY 14, 1908.
F. E. NEUMANN.
SHAVING MIRROR.
APPLICATION FILED OCT. 22, 1907.
2 SHEETS—SHEET 2.
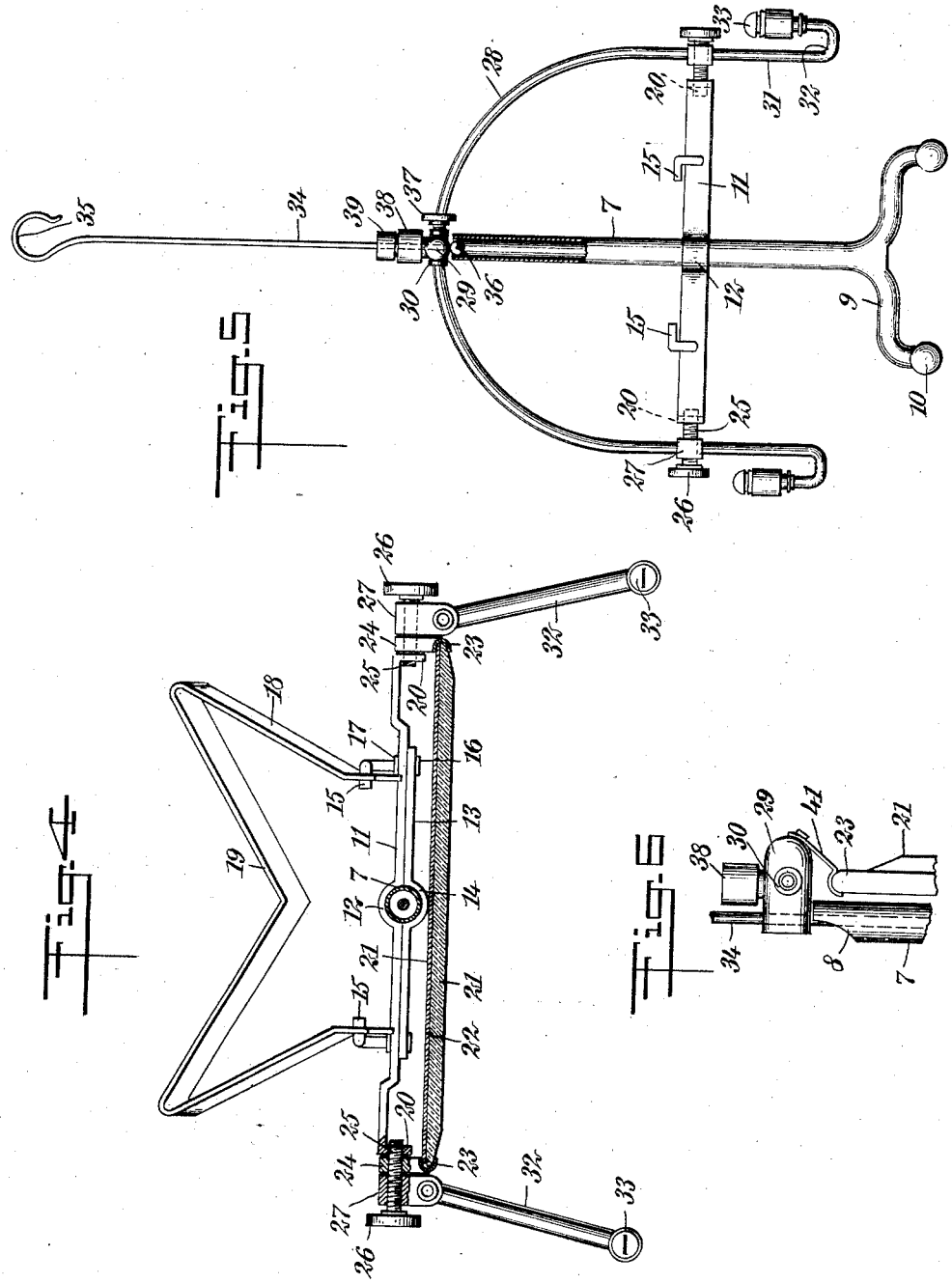
WITNESSES
F. D. Sweet
W. Harrison
INVENTOR
Friederich Eduard Neumann
BY Munn & Co.
ATTORNEYS

UNITED STATES PATENT OFFICE.

FRIEDERICH EDUARD NEUMANN, OF NEW YORK, N. Y.

SHAVING-MIRROR.

No. 893,357.  Specification of Letters Patent.  Patented July 14, 1908.

Application filed October 22, 1907. Serial No. 398,684.

*To all whom it may concern:*

Be it known that I, FRIEDERICH EDUARD NEUMANN, a citizen of the United States, and a resident of the city of New York, borough of Manhattan, in the county and State of New York, have invented a new and Improved Shaving-Mirror, of which the following is a full, clear, and exact description.

My invention relates to mirrors for general use, and particularly adapted for purposes of shaving and the like.

More particularly my invention relates to means for readily adjusting a mirror to different elevations and simultaneously adjusting the positions of the lights whereby the mirror is illuminated.

My invention further relates to means for enabling the mirror and its accompanying parts to be readily folded and packed away.

Reference is to be had to the accompanying drawings forming a part of this specification, in which similar characters of reference indicate corresponding parts in all the figures.

Figure 1 is a front elevation showing the mirror complete, the burners in position and the means for supplying the latter with gas; Fig. 2 is a side elevation otherwise similar to Fig. 1; Fig. 3 is a rear elevation showing how the mirror is held in position in its frame, and also showing the disposition of the mirror relatively to the burners whereby it is illuminated; Fig. 4 is an enlarged horizontal central section through the mirror and a part of its mounting, showing the telescopic rod and tube whereby the height of the mirror is adjusted; Fig. 5 is a rear elevation, partly broken away, showing the telescopic tube used for adjusting, and also the gas pipes for supplying the burners, and the suspension fixture associated with the telescopic tube for adjusting the height of the mirror; and Fig. 6 is a fragmentary side elevation still further enlarged, showing how the top of the mirror is normally held rigid in relation to the supports.

A tube 7 is provided at its top with an opening 8, and at its bottom with a pedestal 9 terminating in knobs 10, the latter being adapted to rest upon a table. A bar 11 is provided with an arcuate bearing portion 12 integral therewith and engaging this bar is another bar 13 provided with an arcuate bearing portion 14 mating the portion 12 of the bar 11. Both of these bars are flat, as will be understood from Figs. 4 and 5.

Pivot pins 15, bent slightly upward and also bent toward each other as indicated in Figs. 4 and 5, are provided with heads 16 and fastenings 17. These pins extend directly through the bars 11, 13, and by aid of the fastenings 17 secure the same firmly together. A brace 18, having an angular portion 19, and made of spring metal in substantially M-shape, is pivotally mounted upon the pivot pins 15. The ends 20 of the bar 11 are bent so as to form bearings, as indicated in Fig. 4. The glass 21 and its back 22 constitute the mirror proper, or reflecting surface, these parts being mounted within a frame 23. This frame is provided with lugs 24 and extending through these lugs and through the bearings 20 are screws 25 which are provided with heads 26 to enable them to be turned. These screws also pass loosely through lugs 27, the latter being provided with smooth holes for the purpose, as will be understood from Fig. 4.

Tubes 28, having together the form of an inverted U, serve as gas pipes and are connected with a head 29, being provided with thimbles 30 integral therewith for this purpose. The gas pipes 28 lead downwardly to unions 31 and below each union is a substantially U-shaped portion 32 of gas pipe carrying a burner 33. A rod 34 is provided with a hook 35 for engaging a nail, a chandelier, or other support, and this rod extends directly through the head 29. Mounted upon the lower end of this rod is a ball 36 which neatly fits the interior of the tube 7. A clamping screw 37 enables the rod 34 to be gripped tightly. The rod 34 being slidable in relation to the head 29 and the screw 37 being adapted to be gripped and released, the height of the mirror and its parts immediately associated therewith may be varied at will.

At 38 is one member of a gas cap coupling, this member being mounted rigidly upon the head 29. A mating coupling 39 is mounted upon the end of a flexible tube 40 for supplying gas to the gas pipe and burners. A spring clasp 41 is mounted upon the head 29 and detachably engages the upper edge of the frame 23 of the mirror (see Fig. 6) so as to hold the latter temporarily in position.

The operation of my device is as follows: The operator first places the hook 35 in engagement with a support, such as a nail or some portion of a chandelier, then loosens the screw 37, and then lowers the gas pipe 28 and parts connected therewith for supporting the mirror. If desired, the knobs 10 and brace 18 may rest upon a solid surface, as indicated in Fig. 2, or may remain suspended. This point having been determined, the operator turns the screw 37 which clamps the tension rod 34. The ball 36 glides easily within the tube 7 and prevents unnecessary play of the parts.

It will be noted that the flexible tube 40 and the telescopic connections, comprising the rod 34 and tube 7, enable not only the mirror to be changed in elevation, but the burners 33 as well, as these go with the mirror.

The mirror having been located at a suitable height the U-shaped portions 32 of the gas pipe are turned so as to bring the burners 33 into any desirable position. The mirror is now ready for use.

In order to enable the mirror to be packed away, the spring clasp 41 is released by merely raising it upward (see Fig. 6), the hook 35 is disengaged from its support and the extension rod 34 pushed downwardly so that the ball 36 goes out of the bottom of the tube 7 to a point intermediate the knobs 10. The extension rod 34 can not readily be shaken out of position. By turning the U-shaped portions 32 of the gas pipe, the burners 33 may be folded against the back of the mirror, preferably under the U-shaped brace 18. The mirror does not tilt while in use, but in order to facilitate packing, it may be turned relatively to the supports whenever the extension rod 34 is raised to its extreme position as indicated in Fig. 1. The ball 36 can not pass through the opening 8 (see Figs. 5 and 6).

Having thus described my invention, I claim as new and desire to secure by Letters Patent:

1. The combination of a tube, a suspension rod mounted to telescope within said tube, said suspension rod being provided with a portion for engaging a support, a head supported by said suspension rod, gas pipes mounted upon said head, a mirror connected with said head, burners connected with said gas pipes, and means for clamping said tube relatively to said suspension rod for adjusting the height of the mirror.

2. The combination of a mirror, lugs engaging the edges thereof for supporting said mirror, a bar extending from one of said lugs to the other across the back of the mirror, a U-shaped gas pipe connected with said last-mentioned lugs and partially supported thereby, said gas pipe being provided with burners for illuminating said mirror, said burners being movable relatively to said lugs supporting said gas pipe and adapted to be folded relatively to said mirror, a head engaging the central portion of said U-shaped pipe, and a connection mounted upon said head and engaging the edge of said mirror.

3. The combination of a mirror, a bar extending across the back of the same for supporting said mirror, lugs connected with the ends of said bar and detachable therefrom for the purpose of disassembling the device, a tube engaging said lugs and partially supported thereby, said tube being provided with burners, means for supplying gas to said tube, a head mounted upon said tube, and a fastening mounted upon said head and detachably engaging the adjacent edge of said mirror.

4. The combination of a tubular member, a supporting rod slidably mounted therein and provided at one of its ends with means whereby it may be suspended from a support, said supporting rod being provided at its other end with a ball to prevent its ready removal from said tubular member, a bar connected with said tubular member, and a mirror supported upon said bar.

5. The combination of a mirror, a bar connected with said mirror and extending across the back thereof, said bar being provided with an arcuate bearing portion, another bar connected with said first-mentioned bar and provided with an arcuate bearing portion mating said bearing portion of said first-mentioned bar, a tubular member encircled by said arcuate bearing portions of said bars so as to enable said tubular member to support said mirror, and means for suspending said tubular member.

In testimony whereof I have signed my name to this specification in the presence of two subscribing witnesses.

FRIEDERICH EDUARD NEUMANN.

Witnesses:
ASHER K. CUNNAUL,
J. H. JACOBS.